United States Patent
Hahn

(10) Patent No.: US 7,391,476 B2
(45) Date of Patent: Jun. 24, 2008

(54) METHOD AND DEVICE FOR INTERPOLATING A PIXEL OF AN INTERLINE OF A FIELD

(75) Inventor: Marko Hahn, Neubiberg (DE)

(73) Assignee: Micronas GmbH, Freiburg (DE)

( * ) Notice: Subject to any disclaimer, the term of this patent is extended or adjusted under 35 U.S.C. 154(b) by 531 days.

(21) Appl. No.: 11/098,587

(22) Filed: Apr. 4, 2005

(65) Prior Publication Data

US 2005/0220365 A1    Oct. 6, 2005

(30) Foreign Application Priority Data

Apr. 2, 2004  (DE) .................... 10 2004 016 350

(51) Int. Cl.
H04N 5/21   (2006.01)
H04N 7/01   (2006.01)
H04N 11/20  (2006.01)

(52) U.S. Cl. ............... 348/625; 348/448; 348/452; 348/458; 348/459; 382/300

(58) Field of Classification Search ........... 348/448, 348/452, 458, 459; 382/300
See application file for complete search history.

(56) References Cited

U.S. PATENT DOCUMENTS

| | | | | |
|---|---|---|---|---|
| 4,723,163 A | 2/1988 | Skinner | | 7/1 |
| 4,740,842 A | 4/1988 | Annegarn et al. | | 7/1 |
| 4,941,045 A | 7/1990 | Birch | | 7/1 |
| 5,081,532 A * | 1/1992 | Rabii | | 348/452 |
| 5,093,721 A * | 3/1992 | Rabii | | 348/448 |
| 5,166,794 A | 11/1992 | Tanaka | | 358/167 |
| 5,446,498 A * | 8/1995 | Boon | | 348/448 |
| 5,475,438 A | 12/1995 | Bretl | | 7/1 |
| 5,568,597 A * | 10/1996 | Nakayama et al. | | 345/606 |
| 5,661,525 A | 8/1997 | Kovacevic et al. | | 7/1 |
| 5,910,820 A * | 6/1999 | Herz et al. | | 348/446 |

(Continued)

FOREIGN PATENT DOCUMENTS

EP      0 610 701      8/1994      ........... 5/44

OTHER PUBLICATIONS

Haan et al.: "Deinterlacing-An Overview" Proceedings of the IEEE, vol. 86, No. 9, Sep. 1998, p. 1839-1857.

(Continued)

*Primary Examiner*—Brian P. Yenke
(74) *Attorney, Agent, or Firm*—O'Shea, Getz & Kosakowski, P.C.

(57) ABSTRACT

A method and device for interpolating a pixel of an interline of a first field in a sequence of interlaced fields includes selecting at least one first pixel and one second pixel from scan lines of the first field adjacent the interline, and a third pixel from a second field temporally preceding or following the first field. The image position of the third pixel corresponds to the image position of the pixel to be interpolated. Also selected are fourth and fifth pixels which lie vertically adjacent the third pixel in the second field. A first filter value is generated by low-pass filtering the at least one first and second image information values. A second filter value is generated by high-pass filtering the third, fourth and fifth image information values. An image information value of the interpolated pixel is generated using the first and second filter values.

12 Claims, 5 Drawing Sheets

U.S. PATENT DOCUMENTS

| | | | | |
|---|---|---|---|---|
| 5,990,978 | A * | 11/1999 | Kim et al. | 348/663 |
| 6,040,869 | A * | 3/2000 | Dischert | 348/448 |
| 6,094,232 | A * | 7/2000 | Bayazit et al. | 348/616 |
| 6,219,102 | B1 | 4/2001 | Wagner et al. | 7/1 |
| 6,414,719 | B1 * | 7/2002 | Parikh | 348/448 |
| 6,545,719 | B1 * | 4/2003 | Topper | 348/448 |
| 6,686,923 | B2 * | 2/2004 | Ji et al. | 345/606 |
| 6,876,395 | B1 * | 4/2005 | Muto et al. | 348/441 |
| 6,898,243 | B1 * | 5/2005 | Alvarez | 375/240.14 |
| 6,941,017 | B2 * | 9/2005 | Ferguson | 382/210 |
| 6,992,725 | B2 * | 1/2006 | Mohsenian | 348/448 |
| 7,015,971 | B2 * | 3/2006 | Sirtori et al. | 348/448 |
| 7,023,487 | B1 * | 4/2006 | Adams | 348/448 |
| 7,043,091 | B2 * | 5/2006 | Michel | 382/266 |
| 7,061,546 | B2 * | 6/2006 | Wischermann | 348/571 |
| 7,088,862 | B1 * | 8/2006 | Silver et al. | 382/199 |
| 7,098,957 | B2 * | 8/2006 | Kim et al. | 348/452 |
| 7,123,781 | B2 * | 10/2006 | Maenaka et al. | 382/300 |
| 7,126,643 | B2 * | 10/2006 | Song et al. | 348/448 |
| 7,136,107 | B2 * | 11/2006 | De Haan et al. | 348/448 |
| 7,142,249 | B2 * | 11/2006 | Hahn et al. | 348/458 |
| 7,167,602 | B2 * | 1/2007 | Yamashita et al. | 382/300 |
| 7,190,406 | B2 * | 3/2007 | Ji et al. | 348/448 |
| 7,202,909 | B2 * | 4/2007 | Major | 348/459 |
| 7,206,027 | B2 * | 4/2007 | De Haan et al. | 348/448 |
| 7,242,819 | B2 * | 7/2007 | Jiang | 382/300 |
| 7,268,821 | B2 * | 9/2007 | Lufkin | 348/448 |
| 7,280,709 | B2 * | 10/2007 | Minami et al. | 382/300 |
| 2001/0015768 | A1 * | 8/2001 | Shin et al. | 348/452 |
| 2003/0081144 | A1 * | 5/2003 | Mohsenian | 348/448 |
| 2003/0095207 | A1 * | 5/2003 | Major | 348/459 |
| 2004/0100579 | A1 | 5/2004 | Hahn et al. | 7/1 |
| 2004/0196901 | A1 * | 10/2004 | Demos | 375/240 |
| 2005/0018077 | A1 * | 1/2005 | De Haan et al. | 348/458 |
| 2005/0030424 | A1 * | 2/2005 | De Haan et al. | 348/458 |
| 2006/0209207 | A1 * | 9/2006 | Chow | 348/448 |
| 2007/0182849 | A1 * | 8/2007 | Hahn et al. | 348/458 |

OTHER PUBLICATIONS

Kovačević et al., "Deinterlacing by Successive Approximation," IEEE Transactions on Image Processing, vol. 6, No. 2, Feb. 1997, pp. 339-344.

* cited by examiner

METHOD AND DEVICE FOR INTERPOLATING A PIXEL OF AN INTERLINE OF A FIELD

PRIORITY INFORMATION

This application claims priority from German application 10 2004 016 350.2-31 filed Apr. 2, 2005, which is hereby incorporated by reference.

BACKGROUND OF THE INVENTION

The invention relates to the field of video signal processing, and in particular to the field of interpolating a pixel of an interline of a first field from a sequence of interlaced fields.

Television signals normally contain information for temporally successive fields which can be displayed on the screen, where two successive fields are interlaced (i.e., have different raster positions). Each field contains image information only in every other scan line, where a scan line for which image information is present in the one field is always empty in the second field. In the following discussion, image information values are understood to mean, specifically, brightness values (luminance values) or color values (chrominance values).

FIG. 1 illustrates two such successive fields A and B, where the first field A has scan lines A1, A2, A3, A4 and A5 for which a received video signal contains image information. The field B includes scan lines B1, B2, B3, B4 and B5 for which a received video signal contains image information. The raster positions of the fields A and B are mutually offset in such a way that the positions of the scan lines of the field B correspond to the positions of the empty interlines of the field A, and vice versa.

In order to enhance image quality, it is often desirable to generate complete frames, i.e., images in which no empty interlines are present.

In one particularly simple method, the approach is to double each of the fields, that is, simply to output the content of a superior or inferior scan line as an interline of a field. In this method, continuous brightness or color transitions in the resulting image have a stepped appearance. In addition, edges running diagonally through the image appear stepped or stair-like.

Another known approach to interpolating a pixel in an interline of a field is to utilize the image information values for pixels that lie vertically adjacent to the pixel to be interpolated, and to implement a linear averaging of these image information values. However, in this method, edges running horizontally through the image are not reproduced sharply.

In addition to the pixels of the field which surrounds the pixel to be interpolated, it is also possible to employ the image information values of temporally preceding or following fields for purposes of interpolation.

European Patent EP 0192292 B1 proposes an approach for interpolating a pixel of an interline from a field in which two pixels are selected from the field in which the pixel to be interpolated is located. That is, one pixel from a scan line above the interpolation pixel and one pixel from a scan line below an interpolation pixel, where the horizontal positions of the selected pixels correspond to the horizontal position of the interpolation pixel. In addition, a pixel of a scan line is selected from a temporally following field, where the position of this pixel corresponds to the pixel position of the interpolation pixel. In this known method, the average value of the image information values for these three pixels is determined, and image information of that pixel is selected for which the image information most closely approximates the average value determined. The pixel of the second field is, in other words, utilized for interpolation if the image information of this pixel lies between the image information values for the pixels of the field with the intermediate spot to be interpolated. Otherwise, the image information of one of the pixels from lines adjacent to the interpolation pixel is selected—with the result that one of these values is doubled, i.e., reproduced twice one below the other. However, this mere repetition of a pixel results in a positionally incorrect display of highly vertical transitions, a phenomenon which is particularly noticeable in edges running diagonally in the image.

The publication Kovacevic J; Safranek, R. J.; Yeh, E. M.: *Deinterlacing by Successive Approximation*, IEEE Transactions on Image Processing, February 1997, pp. 339-344 discloses a method of interpolating a pixel from an interline in which the value of the interpolation pixel is determined utilizing weighting factors, from the pixels lying vertically above and below the interpolation pixel, and from an additional pixel which is selected from a preceding or following field.

U.S. Pat. No. 5,661,525 similarly describes a method of interpolating a pixel in which pixels directly vertically adjacent to the interpolation pixel as well as pixels from preceding or following fields are selected, wherein these selected pixels are weighted to generate the interpolation pixel.

European Patent application EP 0 227 190 describes a method of interpolating a pixel within a field, wherein pixels lying above and below the interpolation pixel are selected and compared. If the difference between these two values is greater than a predetermined value, the larger or the smaller pixel value is selected as the interpolated pixel value. If the difference is smaller than the reference value, one of the two adjacent pixel values, or the average of these pixel values, is selected as the interpolated value.

U.S. Pat. No. 5,910,820 describes a method of interpolating a pixel in which a weighting of selected pixels is implemented depending on a threshold value and depending on the difference between pixel values for the pixels adjacent to the interpolation pixel.

European Patent application EP 0 946 054 A1 describes a method of interpolating a pixel using a weighted 3-tap median filter. The pixels vertically adjacent to the interpolation pixel and the pixels of a temporally preceding or following field are fed to the median filter.

German Patent DE 689 27 957 T2 describes a method of sampling conversion of a television signal, wherein two data values of a first field and a data value of a second field are selected. An average value is generated from the data values of the first field, and a weighted average value is generated from all three data values. One of the three selected data values, the average value of the data values from the first field, or the weighted average value of all data values, is outputted as the interpolated value.

U.S. Pat. No. 5,475,438 describes a method of pixel interpolation in which the average of the pixel values of two pixels is generated which lie vertically adjacent to the interpolation pixel, and in which a pixel is selected from the field preceding the field with the interpolation pixel and from a field following the field with the interpolation pixel. The average value together with the pixel values from the preceding or following field are fed to a median filter, the output value of which is weighted and added to the similarly weighted average value.

There is a need for a system and method for interpolating a pixel of an interline of a field from a sequence of interlaced fields, which ensures a correct display of edges running horizontally through the image, suppression of stepping in diagonally running edges, and a correct reproduction of movements.

SUMMARY OF THE INVENTION

In the method for interpolating a pixel of an interline of a first field which comes from a sequence of interlaced fields, at least one first pixel from a first scan line adjacent to the interline and at least one second pixel from a second scan line adjacent to the interline are selected. A first image information value is associated with the first pixel and a second image information value is associated with the second pixel. A third image information value, fourth image information value, and fifth image information value are also provided. The third image information value is dependent on the image information value of at least one third pixel from a second field, the image position of that corresponds to the image position of the interpolation pixel. The fourth image information value is dependent on the image information value of at least one fourth pixel which lies vertically adjacent to the third pixel in the second field, while the fifth image information value is dependent on the image information value of at least one fifth pixel which lies vertically adjacent to the third pixel in the second field.

A first filter comprising a low-pass filter is applied to the first and second image information values in order to generate a first filter value. A second filter comprising a high-pass filter is applied to the third, fourth, and fifth image information values in order to generate a second filter value. The width of a value interval established by the first and second image information values is determined.

The image information value of the interpolated pixel is generated from the sum of the first filter value and the second filter value when the absolute value of the second filter value is smaller than half the determined interval width. If the absolute value of the second filter value is greater than half the determined interval width, an image information value is output that lies within the interval determined by the first and second image information values, and which can be randomly selected, as the image information value of the interpolation pixel.

The "image information value" may include any information value that can be associated with a pixel, in particular for example, a brightness (luminance) value or a color (chrominance) value.

The low-pass filter comprises, for example, an averaging of the first and second image information values. The high-pass filter of the third, fourth, and fifth image information values comprises, for example, an averaging of the fourth and fifth image information values, and the generation of a difference between the third image information value and the average value, as well as, where appropriate, a suitable scaling of the signal value thus obtained. The second filter may comprise an amplification or attenuation of the filter value obtained by the high-pass filter in order to generate the second filter value from the value obtained by the high-pass filter. In addition, a filter with a nonlinear characteristic, such as for example, a coring filter, may be connected after the high-pass filter of the third, fourth, and fifth image information values in order to suppress the effects of noise on the pixel interpolation. In a coring filter, input values, the absolute values of which are smaller than a predetermined threshold value, are set to zero, while input values, the absolute values of which are greater than the threshold value, are reduced in terms of absolute value by this threshold value.

The third image information value corresponds to the image information value of the third pixel, the fourth image information value corresponds to the image information value of the fourth pixel, and the fifth image information value corresponds to the image information value of the fifth pixel. In another embodiment, the third, fourth, and fifth image information values are each generated by linear averaging of the image information values from multiple pixels which come from temporally successive fields, each time at the same position.

In order to generate the image information value of the interpolation pixel for the case in which the absolute value of the second filter value is greater than half the interval width of the interval spanned by the first and second image information values, a variety of techniques may be used. In one embodiment, the average of the first and second image information values, or a value obtained by a weighted averaging of the first and second image information values, is output as the image information value of the interpolation pixel. In another embodiment, the first or the second image information value is output in this case as the image information value of the interpolation pixel.

A device for pixel interpolation may include a first filter device which has a low-pass filter, to which device the first and second image information values are fed and which supplies a filter signal value; and a second filter device which includes a high-pass filter, to which device the third, fourth, and fifth image information values are fed and which supplies a second filter signal value. An interval determination unit is provided to which the first and second image information values are fed, and which supplies an interval value dependent on half the width of an interval spanned by the first and second image information values. A signal processing unit generates the interpolated image information value, to which unit the first filter signal value, the second filter signal value, and the interval value are fed, and which provides the interpolated image information value dependent on a comparison of the interval value with the second filter signal value. The signal processing unit outputs the sum of the first and second filter value as the image information value when the absolute value of the second filter signal value is smaller than the interval value.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
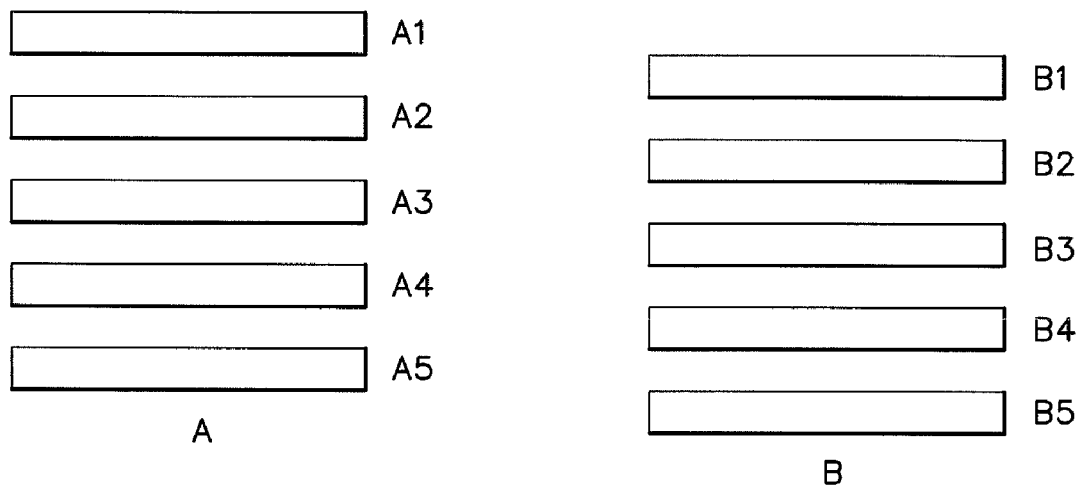
FIG. 1 illustrates a schematic view of two successive interlaced fields.
Figure 2:
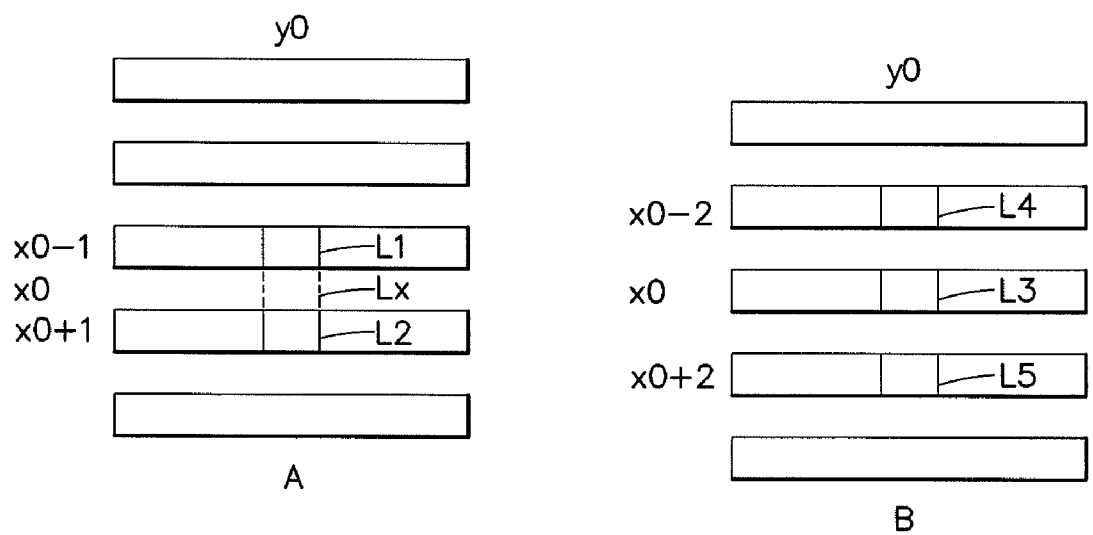
FIG. 2 illustrates two temporally successive fields illustrating the pixels selected from the two fields for the interpolation of a pixel of an interline.

FIG. 2 illustrates two temporally successive interlaced fields A, B. The field A, for example, includes image information values for the odd-numbered lines, while the field B includes corresponding image information values for the even-numbered lines.

x0 denotes the position of an interline in the field A, which lies between adjacent scan lines denoted by x0−1, x0+1. Due to the offset raster position of the successive fields A, B, the field B contains a scan line at line position x0 at which the field A has an interline. x0−2 denotes the line position of a scan line lying above a scan line x0 in field B, while x0+2 denotes the line position of a scan line lying below the scan line x0.

The term image information value denotes an information value associated with a pixel, for example, a luminance value or chrominance value.

In order to interpolate image information value Lx associated with a pixel A(x0,y0) located at the interline x0 of the field A, horizontal position y0, at least five image information values L1-L5 are utilized. The first image information value L1 is associated with a first pixel A(x0−1,y0) which comes from a first scan line x0−1 of the first field A. The scan line x0−1 lies adjacent to the interline x0 containing the interpolation pixel. The horizontal position of the first pixel A(x0−1,y0) corresponds to the horizontal position of the interpolation pixel A(x0,y0). The second image information value L2 is associated with a second pixel A(x0+1,y0) located at a second scan line x0+1 of the first field A, which line is adjacent to the interline x0 to be interpolated. The horizontal position of this second pixel A(x0+1,y0) corresponds to the horizontal position of the interpolation pixel A(x0,y0). The first and second scan lines x0−1, x0+1 lie immediately adjacent above or below the interline x0 to be interpolated.

The third image information value L3 is associated with a third pixel B(x0,y0) located in the second field B, which temporally precedes or temporally follows the first field A. The image position of the third pixel B(x0,y0) corresponds to the image position of the interpolation pixel A(x0,y0). The fourth image information value L4 is associated with a fourth pixel B(x0−2,y0) which comes from a scan line x0−2 adjacent to the third pixel B(x0,y0). The fifth image information value L5 is associated with a fifth pixel B(x0+2,y0) which comes from a scan line x0+2 adjacent to the third pixel B(x0,y0). The horizontal positions of the fourth and fifth pixels B(x0−2,y0), B(x0+2,y0), respectively, correspond to the horizontal position of the third pixel B(x0,y0), and thus to the horizontal position of the interpolation pixel A(x0,y0). The processing of the image information values L1-L5 shall now be discussed.

A first filter value is generated from the first and second image information values L1, L2 as follows:

$$LF1 = k1 \cdot L1 + k2 \cdot L2 \quad (1)$$

where LF1 denotes the first filter value and k1, k2 denote the weighting factors. The applicable terms for these weighting factors are preferably k1=k2=0.5. As a result the first filter value LF1 corresponds to the average of the first and second image information values L1, L2.

A second filter value LF2 is generated from the third, fourth, and fifth image information as follows:

$$LF2 = L3 - 0.5 \cdot (L4 + L5) \quad (2)$$

The second filter signal value LF2 represents the difference between the image information value L3 of the third pixel B(x0,y0), and the average value of the image information values L4, L5 for pixels B(x0−2,y0), B(x0+2,y0).

The width of an interval spanned by the first and second image information values L1, L2 is determined in order to provide an interval width value IN. The value IN corresponds to half the width of the interval spanned by the first and second image information values L1, L2, and is calculated as follows:

$$IN = 0.5 \cdot |L1 - L2| \quad (3)$$

The interval width value IN is compared with the second filter signal value LF2 in order to provide the interpolation pixel value Lx. The applicable conditions here are that the sum of the first and second filter values LF1, LF2 is generated as the interpolated image information value Lx when the absolute value of the second filter value L2 is less than half the width of the interval spanned by the first and second image information values L1, L2. If the absolute value of the second filter value LF2 is greater than half the interval width, then a random value lying within the interval determined by the first and second image information values L1, L2, is generated as the interpolated image information value Lx. The applicable conditions may be expressed as:

$$Lx = LF1 + LF2, \text{ when } |LF2| < 0.5 \cdot IN \quad (4a)$$

$$Lx = \text{random value from } [L1, L2], \text{ when } |LF2| > 0.5 IN \quad (4b)$$

The notation [·] in equation 4b denotes a closed interval (one containing L1 and L2) or an open interval (one not containing L1 and L2).

Whenever the absolute value of the second filter value LF2 is greater than half the interval width IN, an average of the first and second image information values L1, L2, or one of these two image information values L1, L2, is preferably generated as the image information value Lx of the interpolation pixel.

Figure 3:
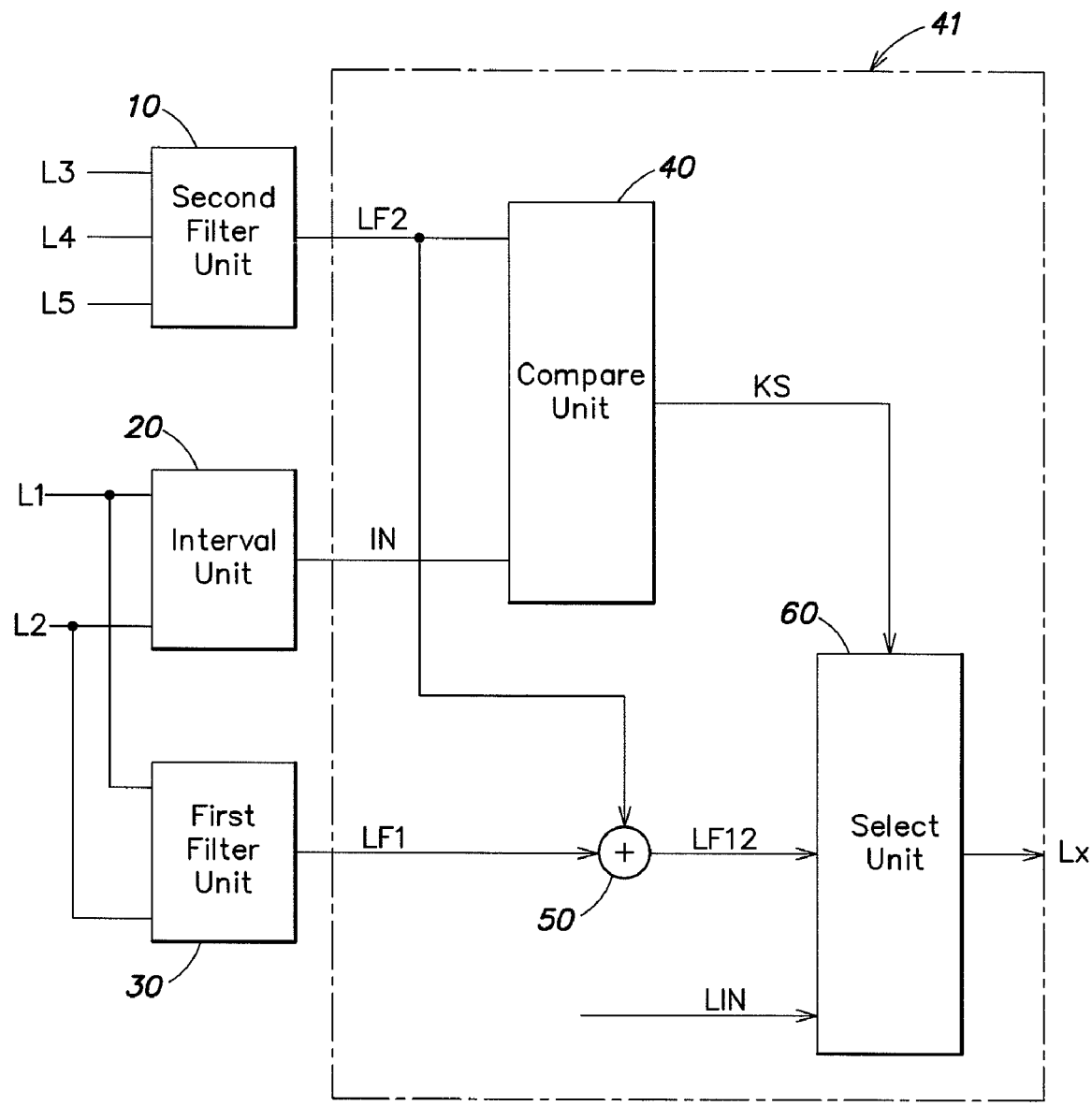
FIG. 3 is a block diagram illustration of a device for interpolating an image information value of a pixel based on five image information values.

FIG. 3 is a block diagram illustration of a device for interpolating an image information value. The device comprises a first filter unit 30 that receives the first and second image information values L1, L2, and generates a first filter value LF1 from the first and second image information values L1, L2 by applying a low-pass filter. An interval determination unit 20 also receives the first and second image information values L1, L2, and provides an interval width value IN dependent on the width of an interval spanned by the first and second image information values L1, L2. The device also comprises a second filter unit 10 that receives the third, fourth, and fifth image information values L3, L4, L5, and provides a second filter value LF2 by applying a high-pass filter.

The interval width value IN, the second filter value LF2, and the first filter value LF1 are input to a signal processing unit 41 that provides the image information value Lx of the interpolation pixel. In the example, the signal processing unit 41 comprises a comparator unit 40 that receives the second filter value LF2 and the interval width value IN, and generates a comparison signal KS. The comparator signal KS is input to a selection unit 60, for example, a multiplexer. A summer 50 sums the first and second filter values LF1, LF2 and the resultant sum LF12 is input to the selection unit 60. The selection unit also receives an image information value LIN, which has been selected from the interval spanned by the first and second image information values L1, L2. The image information value LIN may, for example, match the first filter value LF1, or it may be randomly generated from the first and second image information values L1, L2 by linear averaging.

The comparator signal KS indicates whether or not the absolute value of the second filter value LF2 is less than half the interval width represented by the interval width value IN. If the second filter value LF2 is less than (O SIN), then the selector unit 60 sets the interpolated image information value Lx equal to the summed signal LF12. Otherwise, the value Lx is set equal to LIN.

The image information value LIN is preferably selected in such a way that it utilizes the difference between the second filter value LF2 and the interval width value IN when the second filter value LF2 is greater than interval width value IN. The image information value LIN may, for example, be determined from the first filter value LF1 and the second filter value LF2 based on the following relation:

$$LIN = LF1 + k \cdot LF2 \quad (5)$$

where for the weighting factor k:

$$k \leq 1 \quad (6a)$$

$$k \leq IN/|LF2| \text{ where } k=1 \text{ for } LF2=0 \quad (6b)$$

Preferably, the weighting factor is selected so that $$k = IN/|LF2| \quad (7)$$

In the determination of the image information value using relations 5 and 7, the value LIN corresponds to the first or second image information value. When k<IN/|LF2|, the value LIN lies within the interval spanned by the first and second image information values L1, L2.

Figure 4:
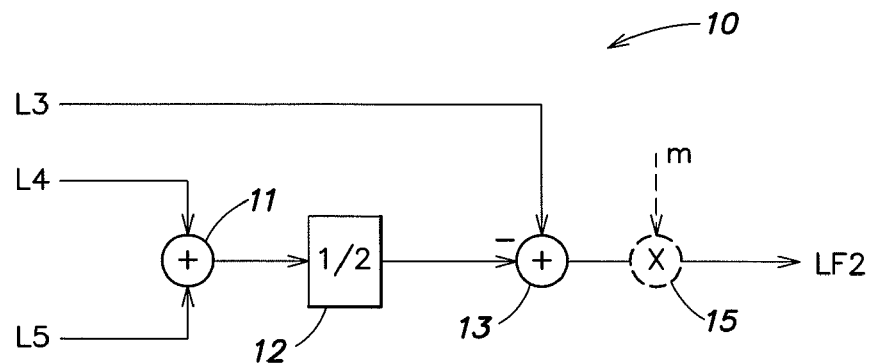
FIG. 4 illustrates an embodiment of a first filter unit.

FIG. 4 illustrates an embodiment of the second filter unit 10. The filter unit 10 comprises an adder 11, to which the fourth and fifth image information values L4, L5 are fed, and a weighting unit 12 which weights the output of the adder signal 11 by a gain factor, for example 0.5. The unit also comprises a subtractor 13 that calculates the difference between the third image information value L3 and the weighted adder output signal, to provide the second filter value LF2. The output signal of the subtractor 13 may be weighted by a weighting factor m using a weighting unit 15, which weighting factor is weighted at greater or less than 1 to amplify or attenuate filter output signal LF2.

Figure 5:
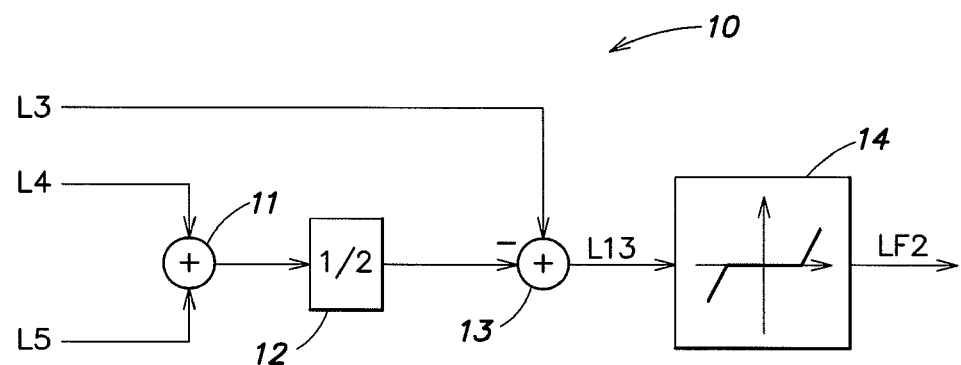
FIG. 5 illustrates an alternative embodiment of the first filter unit.

FIG. 5 illustrates an alternative embodiment of the second filter unit 10. The embodiment in FIG. 5 is substantially the same as the embodiment in FIG. 4 with the principal exception that the embodiment in FIG. 5 includes a coring filter 14 to which the output signal of the subtractor 13 is fed, and at the output of which the second filter value LF2 is provided. The response of the coring filter 14 relative to its input signal L13 and its output signal LF2 can be described as follows:

$$LF2 = L13 + a \text{ for } L13 < -a \quad (5a)$$

$$LF2 = 0 \text{ for } -a < L13 < a \quad (5b)$$

$$LF2 = L13 - a \text{ for } L13 > a \quad (5c)$$

The coring filter thus sets output signal values L13 of the subtractor 13 to zero when their absolute value is smaller than the predetermined coring constant a, and reduces the absolute value of the subtractor output signal L13 by the value of the coring constant a when the absolute value of the subtractor output signal value L13 is greater than the coring constant a. High-pass signal components resulting from noise are effectively suppressed by the coring filter 14.

One of ordinary skill will recognize that it is of course possible to employ filters with any characteristics which in terms of absolute value suppress, or at least attenuate, small input values, while leaving larger input values unchanged or even amplifying them.

Figure 6:
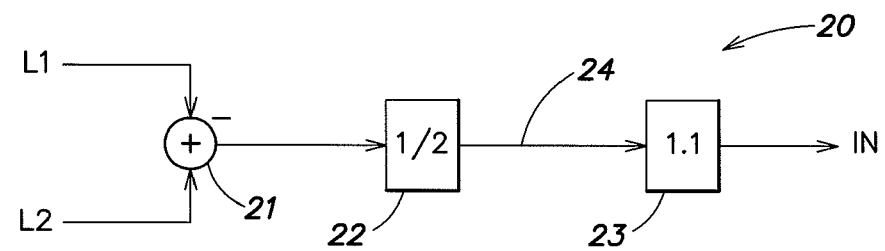
FIG. 6 illustrates an embodiment of an interval determination unit.

FIG. 6 illustrates an embodiment of the interval determination unit 20. The interval determination unit includes a subtractor 21 that calculates the difference between the first and second image information values L1, L2, and the difference is input to a weighting unit 22. The weighting unit weights the subtractor output signal, for example by a weighting factor of 0.5, and provides a weighted output signal on a line 24. The signal on the line 24 is input to an absolute-value generator 23, which provides the interval width value IN.

Figure 7:
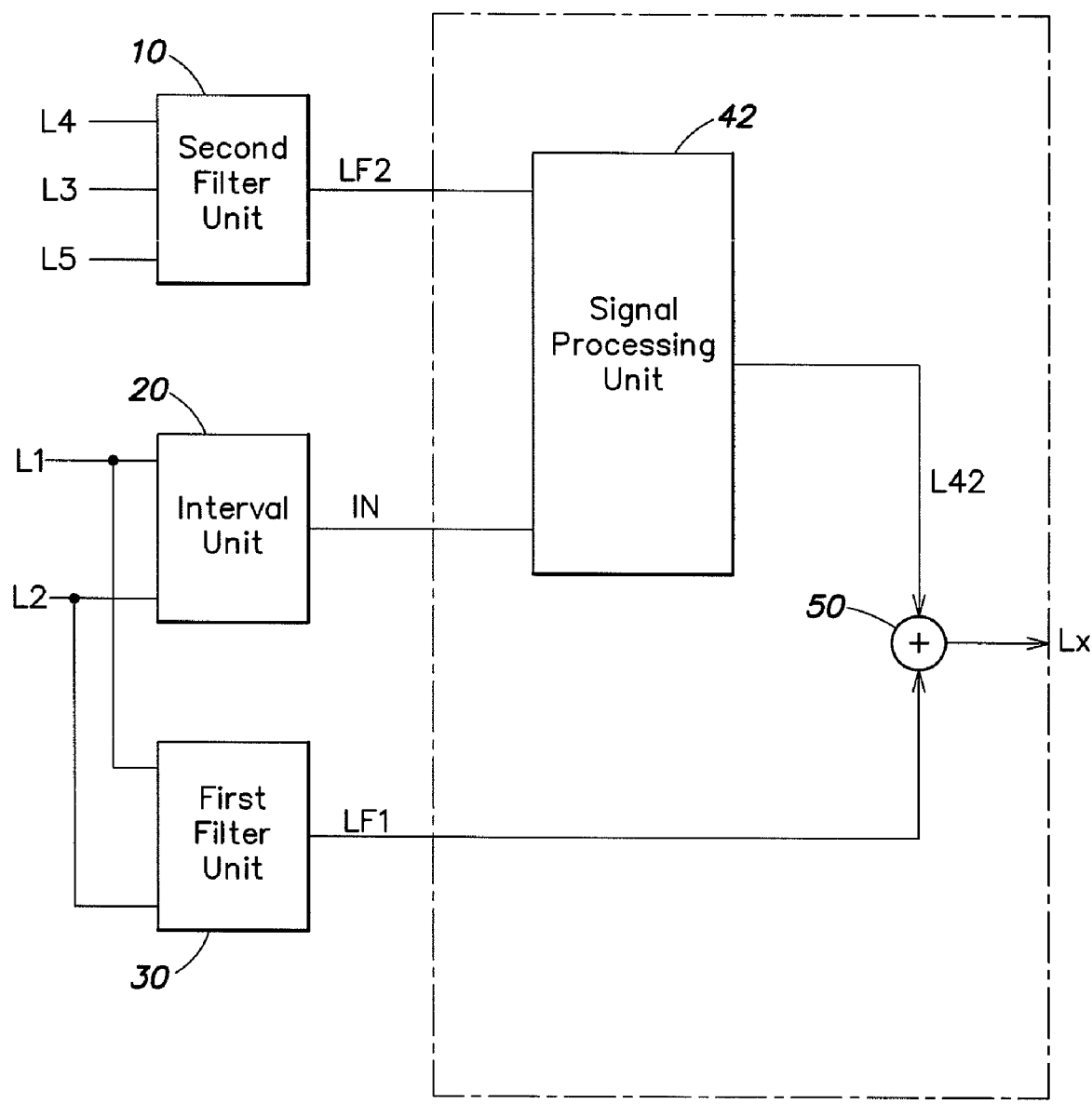
FIG. 7 illustrates another embodiment of a device for pixel interpolation.

FIG. 7 illustrates another embodiment of a device for pixel interpolation. This alternative embodiment includes a signal processing unit 42 that receives the output value LF2 and the interval width value IN, and provides an output value L42. The processing unit 42 compares the interval width value IN with the second filter signal LF2 in order to either set signal value L42 equal to the second filter signal LF2, or to set it to a value, the absolute value of which is smaller than or equal to half of the interval width value IN. An adder 50 sums the signal value L42 and the first filter signal value and provides the interpolated signal value Lx.

Figure 8:
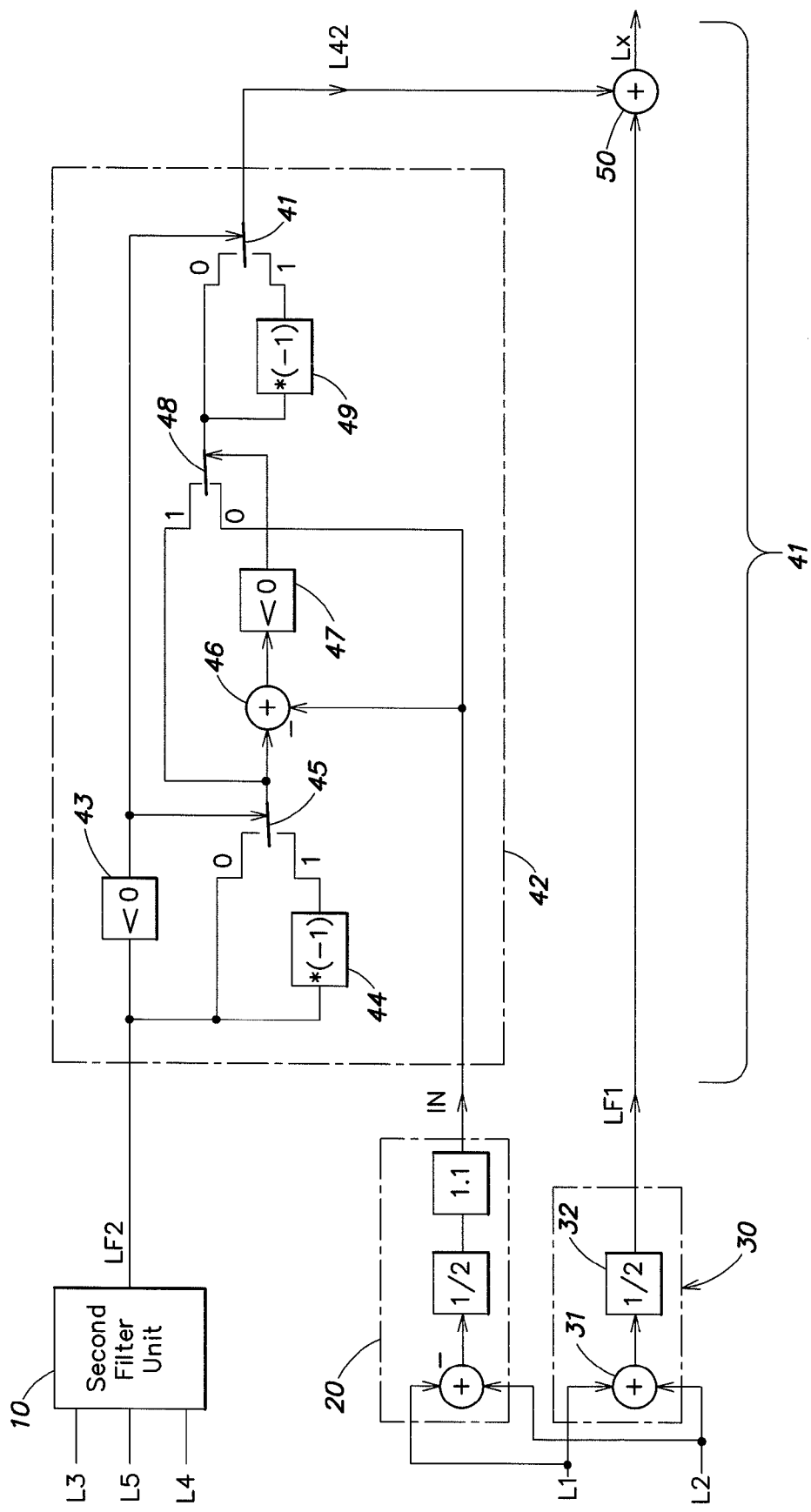
FIG. 8 shows the device of FIG. 7 providing a detailed view of individual units.

FIG. 8 shows the device of FIG. 7 together with a detailed view of the processing unit 42, as well as the interval determination unit 20 and the first filter unit 30.

The first filter unit 30 receives the first and second information values L1, L2, and an adder 31 receives these values to provide a summed signal to a weighting element 32. The weighting element 32 weights the summed signal, for example by a value of 0.5, to provide the first filter value LF1. The first filter value LF1 thus corresponds to the average of the first and second image information values L1, L2. The applicable equation for the interval width value IN in the embodiment of FIG. 8 is:

$$IN = 0.5 \cdot |L2 - L1| \quad (6)$$

i.e., the interval width value IN corresponds to half the mathematical distance between the first and second image information values L1, L2.

The processing unit 42 provides an output signal L42, the absolute value of which is upwardly limited to the value of the interval width value IN, and the sign of which corresponds to the sign of the second filter value LF2. Outputted as the output signal L42 is a signal, the absolute value of which corresponds to the absolute value of second filter value LF2 when the absolute value of the second filter value LF2 is smaller than interval width value IN. If the absolute value of the second filter value LF2 is greater than the interval width value IN, an output signal L42 is outputted, the absolute value of which corresponds to the interval width value. The output signal thus encompasses a maximum value range of [−IN . . . IN].

The processing unit 42 comprises a first comparator 43 which determines whether the second filter signal value LF2 has a positive or negative sign, and controls a first and second switch 41, 45 dependent on this comparison. When the second filter value LF2 is positive, the second switch 45 feeds the second filter signal value LF2 to a subtractor 46. When the second filter signal value LF2 is negative, the switch 45 feeds the second filter value LF2 multiplied by a first weighting unit 44 by a multiplication factor −1, to a subtractor 46. The comparator 43, the weighting unit 44, and the second switch 45 perform the function of an absolute value generation unit that provides a positive value corresponding to the absolute value of the second filter value LF2 to the subtractor 46.

The subtractor 46 subtracts the interval width value IN from the absolute value of the second filter signal value LF2. The output signal of the subtractor 46 is input to a second comparator 47 which compares the subtractor output signal with zero, and thereby determines whether the absolute value of the second filter signal value LF2 is greater or less than the interval width value IN. The second comparator 47 controls the changeover switch 48 to which the absolute value of the second filter value LF2 and the interval width value IN are fed and passes on the absolute value of the second filter signal value LF2 when the subtractor output signal is less than zero, or the interval width value IN when the subtractor output signal is greater than zero.

A second weighting unit 49 and the second switch 41 connected on the input side of the second output thus ensure that the signal output signal passed on by the switch 48 is multiplied by a multiplication factor −1 when the second filter signal value LF2<0. In other words, a value L42 is output, the absolute value of which corresponds to the absolute value of LF2 when the absolute value of LF2 is smaller than the interval value IN, and the absolute value of which otherwise corresponds to the interval value IN. The sign of output value L42 is selected in accordance with the sign of the second filter value LF2.

Although the present invention has been shown and described with respect to several preferred embodiments thereof, various changes, omissions and additions to the form and detail thereof, may be made therein, without departing from the spirit and scope of the invention.

What is claimed is:

1. A method of interpolating a pixel of an interline of a first field in a sequence of interlaced fields, the method comprising the steps of:
    selecting at least one first pixel, with which a first image information value is associated, from a scan line lying adjacent to the interline, and at least one second pixel, with which a second image information value is associated, from a second scan line lying adjacent to the interline;
    providing a third image information value which is dependent on an image information value of at least one third pixel from a second field temporally preceding or following the first field, an image of this second field corresponding to an image position of the pixel to be interpolated, providing a fourth image information value which is dependent on an image information value of at least one fourth pixel which lies vertically adjacent to the third pixel, and providing a fifth image information value which is dependent on an image information value of at least one fifth pixel which lies vertically adjacent to the third pixel;
    generating a first filter value by low-pass filtering the at least one first and second image information values;
    determining a width of an interval established by the first and second image information values;
    generating a second filter value by high-pass filtering the third, fourth, and fifth image information values;
    generating an image information value for the interpolated pixel as a sum of the first filter value and the second filter value when the absolute value of the second filter value is smaller than half the interval width; and
    generating an image information value for the interpolated pixel such that the image information value lies within the interval width when the second filter value is greater than half the interval width.

2. The method of claim 1, where the step of low-pass filtering comprises the step of averaging the first and second image information values.

3. The method of claim 1, where the step of high-pass filtering comprises the step of averaging the at least one fourth and fifth image information values and generating a difference between the third image information value and the averaged fourth and fifth information values.

4. The method of claim 1, where the step of generating a second filter value comprises applying a gain factor.

5. The method of claim 1, where the step of high-pass filtering utilizes a high-pass filter with the following response:

$$y=x+a \text{ for } x<-a$$

$$y=0 \text{ for } -a \leq x \leq a$$

$$y=x-a \text{ for } x>a$$

where x is the filter input signal, y is the filter output signal, and a>0.

6. The method of claim 1, where the third image information value corresponds to the image information value of the third pixel, the fourth image information value corresponds to the image information value of the fourth pixel, and the fifth image information value corresponds to the image information value of the fifth pixel.

7. The method of claim 1, where the third image information value is generated by linear averaging of the image information value of the third pixel as well as from image information values of additional pixels at the pixel position of the third pixel from temporally preceding or following fields, where the fourth image information value is generated by linear averaging of the image information value of the fourth pixel as well as from image information values of additional pixels at the pixel position of the fourth pixel from temporally preceding or following fields, and where the fifth image information value is generated by linear averaging of the image information value of the fifth pixel as well as from image information values of additional pixels at the pixel position of the fifth pixel from temporally preceding or following fields.

8. The method according to claim 1, further comprising the step of outputting the first or second image information value as the image information value of the interpolated pixel when the second filter value is greater than half the interval width.

9. The method of claim 1, further comprising the step of mixing the first and second image information values to generate the image information value of the interpolated pixel when the second filter value is greater than half the interval width.

10. A pixel interpolation device, comprising:
    a first filter device that comprises a low-pass filter and receives first and second image information values and which provides a first filter signal value;
    a second filter device that comprises a high-pass filter and receives third, fourth, and fifth image information values, and which provides a second filter signal value;
    an interval determination unit that receives the first and second image information values and which provides an interval value which is dependent on a width of an interval spanned by the first and second image information values; and
    a signal processing unit that receives the first filter signal value, the second filter signal value, and the interval value, and provides an interpolated image information value dependent on a comparison of the interval width with the second filter signal value;
    where the signal processing unit provides at its output the sum of the first and second filter values as the image information value when the absolute value of the second filter signal value is less than the interval width.

11. The device of claim 10, where the signal processing unit provides as the image information value a value which lies within the interval spanned by the first and second image information values when the absolute value of the second filter signal value is greater than the interval width.

12. The device of claim 11, where the interval width corresponds to 0.5 times the interval width.

* * * * *